(12) United States Patent
Baker

(10) Patent No.: US 7,319,468 B2
(45) Date of Patent: Jan. 15, 2008

(54) IMAGE DISPLAY APPARATUS

(75) Inventor: Keith Baker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 20 days.

(21) Appl. No.: 10/506,833

(22) PCT Filed: Feb. 12, 2003

(86) PCT No.: PCT/IB03/00544

§ 371 (c)(1),
(2), (4) Date: Sep. 7, 2004

(87) PCT Pub. No.: WO03/077542

PCT Pub. Date: Sep. 18, 2003

(65) Prior Publication Data

US 2005/0125834 A1    Jun. 9, 2005

(30) Foreign Application Priority Data

Mar. 11, 2002    (EP)  ................................... 02076004

(51) Int. Cl.
*G06T 15/00*    (2006.01)

(52) U.S. Cl. ........................ 345/629; 348/563; 348/578

(58) Field of Classification Search ................ 345/629; 348/578, 584, 563, 464
See application file for complete search history.

(56) References Cited

U.S. PATENT DOCUMENTS

| | | | | |
|---|---|---|---|---|
| 4,486,779 A * | 12/1984 | Marti | ......................... | 348/464 |
| 5,345,270 A * | 9/1994 | Saeger et al. | ............. | 348/435.1 |
| 5,657,095 A * | 8/1997 | Yoshida et al. | ............. | 348/584 |
| 5,734,436 A * | 3/1998 | Abe et al. | .................... | 348/564 |
| 5,929,927 A * | 7/1999 | Rumreich et al. | .......... | 348/563 |
| 6,195,459 B1 * | 2/2001 | Zhu | ........................... | 382/176 |
| 6,208,386 B1 * | 3/2001 | Wilf et al. | .................. | 348/578 |
| 6,505,153 B1 * | 1/2003 | Van Thong et al. | ........ | 704/211 |
| 7,075,587 B2 * | 7/2006 | Lee | .............................. | 348/563 |

* cited by examiner

*Primary Examiner*—Phu K. Nguyen

(57) ABSTRACT

An image display apparatus for displaying a series of consecutive output images which are based on a series of consecutive input images, with the series of consecutive input images including a first image and a second image, is arranged to split the images of the series of consecutive input images in first parts and second parts; and to display a first one of the output images which include a first block of pixels corresponding to a first one of the first parts of the first input image and a second block of pixels (124) corresponding to a first one of the second parts of the second input image.

5 Claims, 4 Drawing Sheets

IMAGE DISPLAY APPARATUS

The invention relates to an image display apparatus comprising:

means for receiving a video stream representing a series of consecutive input images, with the series of consecutive input images comprising a first image and a second image; and a display device for displaying a series of consecutive output images which are based on the series of consecutive input images.

The invention further relates to a method of displaying a series of consecutive output images which are based on a series of consecutive input images, with the series of consecutive input images comprising a first image and a second image.

The invention further relates to a TV comprising such an image display apparatus.

In video broadcasting, subtitles are employed to convey textual information to the viewer. The subtitles accompany an audio/video broadcast and provide supplemental information to the viewer that may not be perceivable from the broadcast. Subtitles are frequently used, for example, to aid hearing impaired viewers by displaying the spoken language recorded in the audio soundtrack as written language. Another example, is where subtitles are displayed in different languages than the spoken language recorded in the audio soundtrack. In addition, subtitles may be employed to convey important information not related to the subject matter of the corresponding audio/video broadcast. In this case, subtitles may represent late-breaking news, such as: emergency information; sports scores, weather reports or information of the stock exchange. Frequently the information is provided by means of a banner. The textual information moves relative to the display screen of the display apparatus. Typically the direction of the movement is in a horizontal or vertical direction.

In television broadcasting or video reproduction, such as from a video tape or disk, the subtitles or banners are previously superimposed on the broadcast and become part of the received images. Hence the display of the information of the subtitles or banners is linked with the display of the other video content. It is a disadvantage that in many cases the provided textual information of the subtitles or the banner is only visible for a limited period of time.

It is an object of the invention to provide an image display apparatus of the kind described in the opening paragraph on which a spatial part of a received series of input images is visible for a relatively long period.

The object of the invention is achieved in that the image display apparatus is arranged:

to split the consecutive input images into respective first parts and respective second parts; and to display a first one of the output images comprising a first block of pixels corresponding to the first part of the first input image and a second block of pixels corresponding to the second part of the second input image.

If further output images also comprise the first one of the first parts of the first input image then it can be seen as if the corresponding part of the display device is frozen. The other part of the display device is updated on a regular base with consecutive second parts. Note that it is known to freeze the entire display device. However in this case only a part of the display device is frozen while the other part is not. The invention is advantageous in the case that the first parts of the received input images correspond to respective portions of a banner: it can be seen as if the movement of the banner is stopped. By doing this the readability of the banner is enhanced. The invention is also advantageous in the case that the first parts of the received input images correspond to subtitles. By freezing the corresponding part of the display device, the user of the image display apparatus has more time to read, or reread the subtitle.

An embodiment of the image display apparatus according to the invention comprises user interface means to provide location information of the first parts to control splitting of the images of the series of consecutive input images. It is assumed that in a default display mode of the image display apparatus the entire display device is updated on a regular base. However if the received input images comprise distinct parts then it is advantageously to split the images in first parts and second parts and to control the display of the first parts independently of the second parts. Location information of the first parts relative to the second parts is required in order to split the received input images. A first option is that the user of the image display apparatus provides this information, e.g., by dragging a graphics box or by manipulation of a graphics line being displayed on the display device as a kind of overlay. Automatic segmentation of the input images is another option to determine the location information. Motion estimation is a good basis for this segmentation. Alternatively the location information is provided by means of the broadcast.

An embodiment of the image display apparatus according to the invention comprises a first memory device for storage of the location information. The location information is relatively constant. By storing the location information it is no longer required to determine or provide the location information again. Optionally multiple instances of the location information are stored as a presetting for the various broadcasting channels. In that case a user of the image display apparatus might start the required display mode, i.e. partially frozen display mode, with one push of a button of the remote control. Optionally the image display apparatus automatically switches from a default display mode in which the entire display device is updated on a regular base into the partially frozen display mode. This switching might be triggered by a "banner-event", i.e. the presence of a banner is detected.

An embodiment of the image display apparatus according to the invention comprises:

a motion estimation unit for estimating motion in the first parts;

processing means to calculate a time period during which a particular part of the banner moves from a first predetermined location relative to the display device to a second predetermined location relative to the display device; and a selector to select a further one of the first parts of a further input image, on basis of the time period.

An advantageous of this embodiment of the image display apparatus is that it is arranged to remove redundancy in the first parts. First parts of consecutive input images comprise portions which are also comprised by other first parts of the consecutive input images. This embodiment of the image display apparatus is arranged to create a set of first parts of the input images, of which the elements of the set have a minimum of overlap with each other, but which together comprise a maximum of the information conveyed by the banner. The elements of the set might be displayed automatically or on basis of a user input. Optionally these first parts are stored in a second memory device. This enables browsing through the set of first parts.

An embodiment of the image display apparatus according to the invention comprises:

a character analyzer designed to search for textual information in the first parts; and a comparing unit for comparing parts of the textual information with a predetermined string of characters.

This embodiment of the image display apparatus is arranged to search for specific textual information in the first parts conveyed by a banner or subtitle. When this textual information is detected then one of the first parts comprising this textual information is displayed on the display device. An example of such a character analyzer is specified in U.S. Pat. No. 6,195,459.

It is a further object of the invention to provide a method of the kind described in the opening paragraph with which a spatial part of a received series of input images is visible for a relatively long period.

This object of the invention is achieved in that the method comprises:

a splitting step of splitting the consecutive input images into respective first parts and respective second parts; and a display step of displaying a first one of the output images comprising a first block of pixels corresponding to the first part of the first input image and a second block of pixels corresponding to the second part of the second input image.

Modifications of the image display apparatus and variations thereof may correspond to modifications and variations thereof of the method described.

These and other aspects of the image display apparatus, of the TV and of the method according to the invention will become apparent from and will be elucidated with respect to the implementations and embodiments described hereinafter and with reference to the accompanying drawings, wherein:

FIG. 1 schematically shows a series of input images and a series of output images according to the invention;

FIG. 2 schematically shows an embodiment of the user interface for the control of the splitting;

FIG. 3 schematically shows the relation between a banner and a series of consecutive input images;

FIG. 4 schematically shows an embodiment of the image display apparatus;

Corresponding reference numerals have same or like meaning in all of the Figs.

Figure 1:
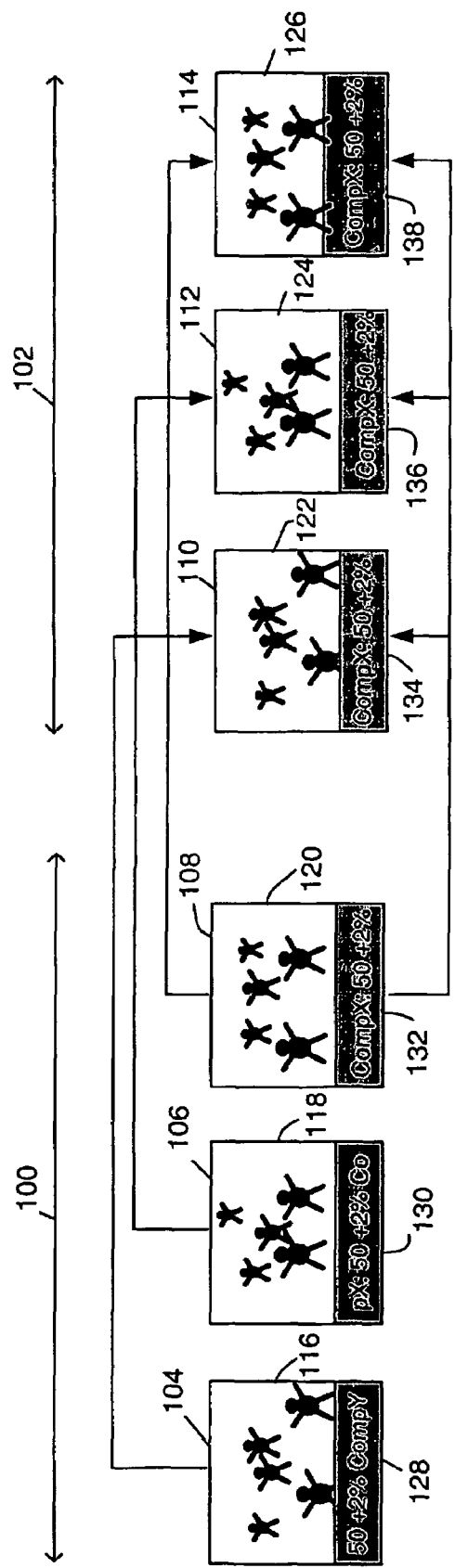

FIG. 1 schematically shows a series 100 of input images 104-108 and a series 102 of output images 110-114 according to the invention. The images 104-114 represent a portion of a sport game. Besides that, textual information is provided in the lower parts 128-138 of the images 104-114. The parts 116-126 of the images representing the portion of the sport game do not overlap with the lower parts 128-138 of the images. A first one 114 of the consecutive output images 110-114 comprises a first part 138 which corresponds to a first block of connected pixels 132 of a first one 108 of the series of consecutive input images 104-108, and a second part 126 which corresponds to a second block of connected pixels 120 of the first one 108 of the series of consecutive input images 104-108. A second one 112 of the consecutive output images 110-114 comprises a first part 136 which also corresponds to a first block of connected pixels 132 of the first one 108 of the series of consecutive input images 104-108, and a second part 124 which corresponds to a second block of connected pixels 118 of a second one 106 of the series of consecutive input images 104-108. A third one 110 of the consecutive output images 110-114 comprises a first part 134 which also corresponds to a first block of connected pixels 132 of the first one 108 of the series of consecutive input images 104-108, and a second part 122 which corresponds to a third block of connected pixels 116 of a third one 104 of the series of consecutive input images 104-108. Hence, the output images 110-114 comprise blocks of pixels 134-138 which correspond to the same first part 132 of one 108 of the input images 104-108.

Figure 2:
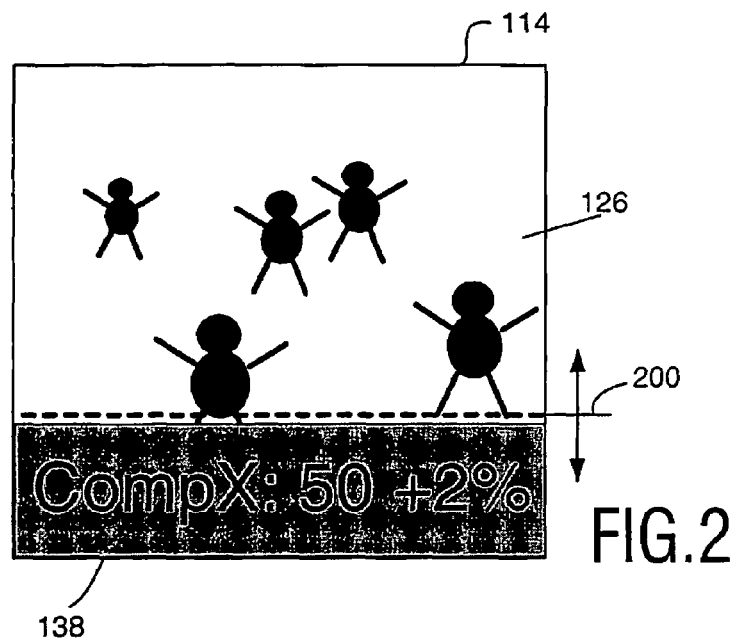

FIG. 2 schematically shows an embodiment of the user interface for the control of the splitting between a first part 138 and a second part 126 of the output image 114. On the display device 406 a graphics line 200 is drawn as an overlay of the output image 114. The user of the image display apparatus 400 can adapt the position of the line by means of pushing a plus or minus button of the remote control of the image display apparatus 400. Such manipulation of the display can be achieved using the facilities of the OSD (On Screen Display) features of the display apparatus 400 and or other graphics features of the display apparatus 400. The position of the line 200, corresponds to the location information which is required to split the images 104-108 of the series 100 of input images in first parts 128-132 and second parts 116-120. Optionally the position of the line 200 is stored in a memory device. Preferably multiple instances are stored, e.g. a first position for channel 1, a second position for channel 2, etcetera.

Figure 3:
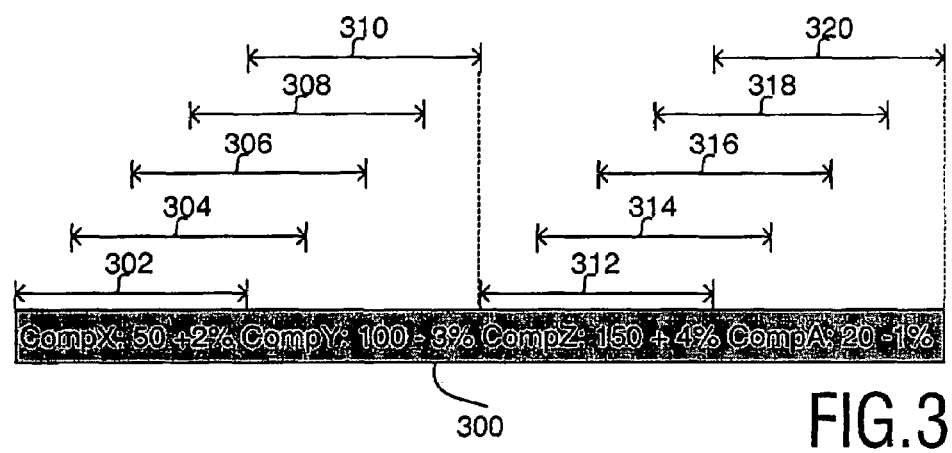

FIG. 3 schematically shows the relation between a banner 300 and a series 100 of consecutive input images 104-108. A banner 300 can be seen as a strip of information which moves relative to the display device 406. In a default display mode of the image display apparatus on which a banner 300 is displayed the output images comprise overlapping parts of the banner 300. E.g. a first image comprises a first portion 302 of the banner 300, a second image comprises a second portion 304 of the banner 300, a third image comprises a third portion 306 of the banner 300, etcetera. These portions 302-320 partly overlap with each other. However there are pairs of portions which do not have overlap e.g. first portion 302 and fifth portion 310. It can be seen from FIG. 3 that with a combination of non-overlapping portions, e.g. 302, 310, 312 and 320 the entire banner 300 can be represented. By selecting the appropriate images of the series of input images a set of first parts of the input images can be created, of which the elements of the set have a minimum of overlap with each other, but which together comprise a maximum of the information conveyed by the banner 300. Optionally these parts are stored in a memory device 516. See FIG. 5B.

An approach of finding these first parts is based on estimating motion. Motion estimation can be performed by a standard motion estimation unit. A standard motion estimation unit might be the motion estimation unit which is known from the article "True-Motion Estimation with 3-D Recursive Search Block Matching" by G. de Haan et. al. in IEEE Transactions on circuits and systems for video technology, vol. 3, no. 5, October 1993, pages 368-379. The motion estimation unit provides a motion vector field. This motion vector field has to be analyzed, on basis of a motion model of constant translation to determined the velocity of the banner. The velocity of the banner determines the overlap between parts of consecutive images. With knowledge of the dimension of the display area of the banner 300 the number of images to be skipped can be calculated. As a consequence only the first parts from one out of N images have to be dealt with, e.g. stored or displayed.

Figure 4:
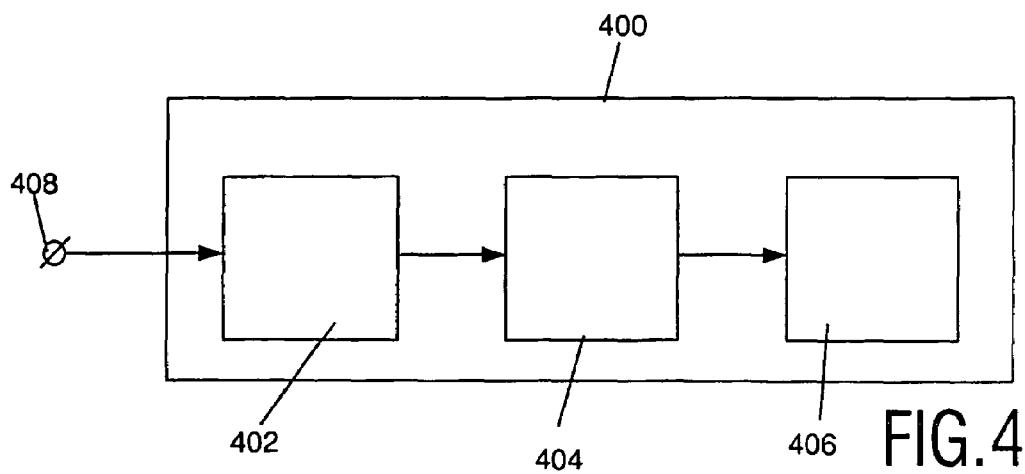

FIG. 4 schematically shows an embodiment of the image display apparatus 400 comprising:

receiving means 402 for receiving a signal representing input images 104-108 to be processed. The signal may be a broadcast signal received via an antenna or cable but may also be a signal from a storage device like a VCR (Video Cassette Recorder) or Digital Versatile Disk (DVD). The signal is provided at the input connector 408. The receiving means 402 is arranged to be tuned to a predetermined frequency band to extract the input images 104-108 from the provided signal.

processing means 404 for making the output images 110-114 on basis of the input images 104-108; The processing means comprises memory devices 500 and 516, display means for displaying the output images 110-114. This display means is optional. The functionality can also deployed by making use of a e.g. Set-top box. In that case the displaying is done by a Television and other parts of the processing by means the Set-top box.

Figure 5A:
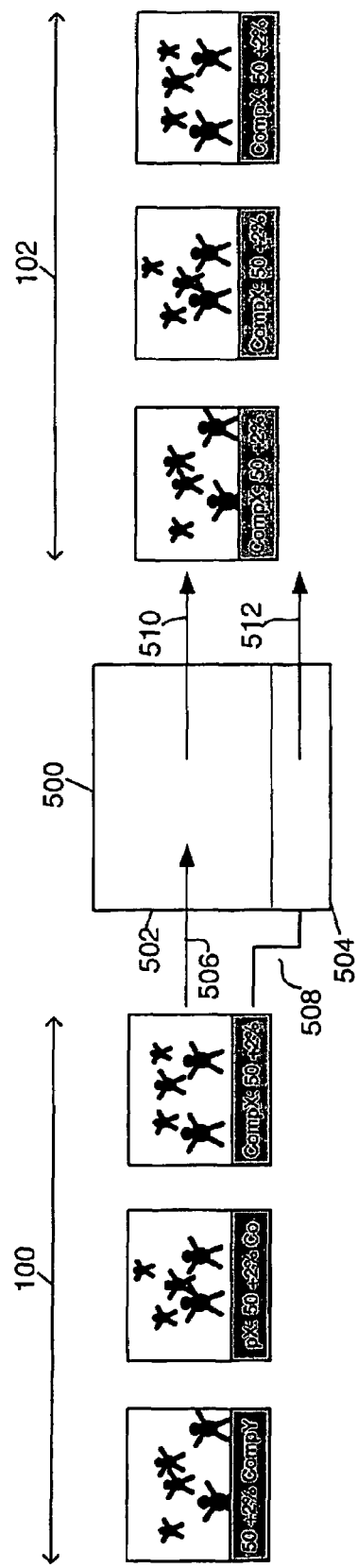
FIG. 5A shows a data-flow diagram.

FIG. 5A shows a data-flow diagram. In FIG. 5A a memory device 500 is depicted which is logically divided in a first part 504 in which first parts 128-132 of input images 104-108 are written 508 and a second part 502 in which second parts 116-120 are written 506. To display an output image 110-114 the memory device is accessed for reading 512 the appropriate first 134-138 and for reading 510 the second parts 122-126. In default display mode of the image display apparatus 400 the frequency of reading 512 first parts 134-138 and of reading 510 second parts 122-126 for the output images 110-114 is equal with writing 508 first parts 128-132 and writing 506 second parts 116-120. However in the partially frozen display mode of the image display apparatus 400 the frequency of writing 508 first parts 128-132 is zero, i.e. no updates of the portion 504 of the memory device 500 for storing first parts 128-132. Hence the stored first part 132 is repeatedly read. Note that in principle there is no need for storing second parts 116-120 because these are directly displayed. The required memory size depends on the first parts 128-132 only.

Figure 5B:
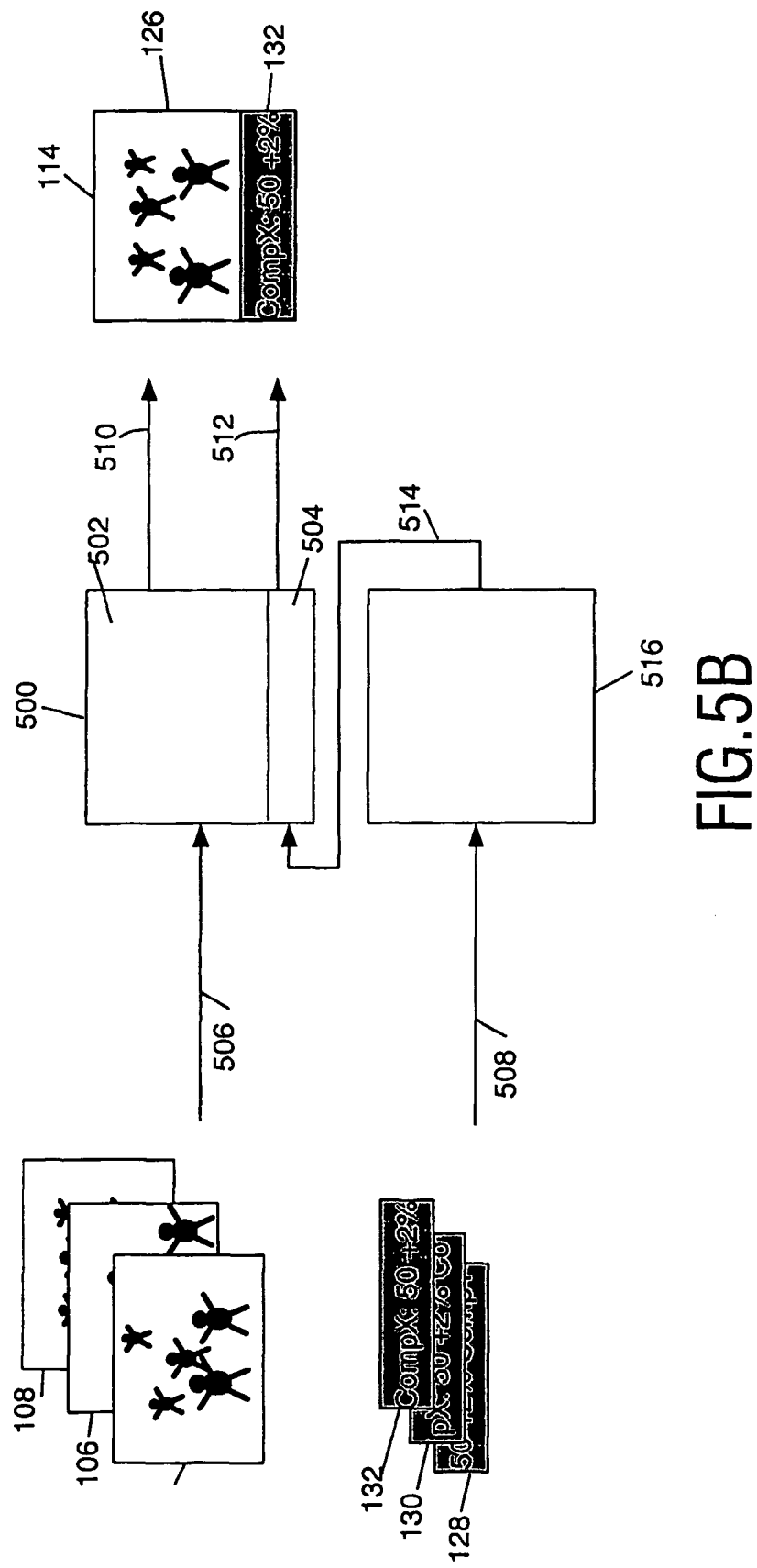
FIG. 5B shows an alternative data-flow diagram.

FIG. 5B shows an alternative data-flow diagram. A second memory device 516 is available for storage of multiple first parts corresponding to non-overlapping portions 302, 310, 312 and 320 of a banner 300. One of the first parts is selected and written 514 to the first part 504 of the other memory device 500. The selection can be based on a direct user control: next first part. Alternatively the selection is based on a match of textual information comprised by the selected first part and a predetermined character string.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. An image display apparatus comprising:
    means for receiving a video stream representing a series of consecutive input images, with the series of consecutive input images comprising a first image and a second image; and
    a display device for displaying a series of consecutive output images which are based on the series of consecutive input images, wherein the image display apparatus is arranged:
    to split the consecutive input images into respective first parts and respective second parts; and
    to display a first one of the output images comprising a first block of pixels corresponding to the first part of the first input image and a second block of pixels corresponding to the second part of the second input image;
    a motion estimation unit for estimating motion in the first parts;
    processing means to calculate a time period during which a particular part of the first parts moves from a first predetermined location relative to the display device to a second predetermined location relative to the display device; and
    a selector to select a further one of the first parts of a further input image on basis of the time period.

2. The image display apparatus as claimed in claim 1, further comprising a second memory device for storing the further one of the first parts.

3. A method of displaying a series of consecutive output images which are based on a series of consecutive input images, with the series of consecutive input images comprising a first image and a second image, the method comprising the acts of:
    splitting the consecutive input images into respective first parts and respective second parts;
    displaying a first one of the output images comprising a first block of pixels corresponding to the first part of the first input image and a second block of pixels corresponding to the second part of the second input image;
    estimating motion in the first parts;
    calculating a time period during which a particular part of the first parts moves from a first predetermined location relative to the display device to a second predetermined location relative to the display device; and
    selecting a further one of the first parts of a further input image on basis of the time period.

4. A display apparatus comprising:
    an input configured to receive input images having corresponding first input parts and second input parts;
    a display device configured to display output images having said corresponding first input parts and output parts;
    a motion estimation unit for estimating motion in said second input parts of said input images;
    a processor configured to calculate a time period during which a particular part of said second input parts moves from a first predetermined location relative to the display device to a second predetermined location relative to the display device; and
    a selector to select a further one of said second input parts of a further input image on basis of the time period;
    wherein a predetermined number of said output images have said output parts corresponding to one second input part of said second input parts so that said one second input part is constantly displayed over said predetermined number of said output images.

5. An image display apparatus comprising:
    means for receiving a video stream representing a series of consecutive input images, with the series of consecutive input images comprising a first image and a second image; and
    a display device for displaying a series of consecutive output images which are based on the series of consecutive input images, wherein the image display apparatus is arranged:
    to split the consecutive input images into respective first parts and respective second parts;

to display a first one of the output images comprising a first block of pixels corresponding to the first part of the first input image and a second block of pixels corresponding to the second part of the second input image;

a character analyzer designed to search for textual information in the first parts; and a comparing unit for comparing parts of the textual information with a predetermined string of characters; wherein the first part is constantly displayed on the display device for viewing by a viewer as a constant image while the second part is variably displayed on the display device for viewing by the viewer as a varying image.

* * * * *